United States Patent
Lu

(10) Patent No.: US 8,549,212 B2
(45) Date of Patent: Oct. 1, 2013

(54) FLASH STORAGE DEVICE AND OPERATION METHOD THEREOF

(75) Inventor: Chao-Hsin Lu, Tainan (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 747 days.

(21) Appl. No.: 12/641,612

(22) Filed: Dec. 18, 2009

(65) Prior Publication Data

US 2011/0029720 A1 Feb. 3, 2011

(30) Foreign Application Priority Data

Jul. 31, 2009 (TW) .................................. 98125797 A

(51) Int. Cl.
*G06F 12/00* (2006.01)
(52) U.S. Cl.
USPC ...................................... 711/103; 365/185.33
(58) Field of Classification Search
USPC ...................................... 711/103; 365/185.33
See application file for complete search history.

(56) References Cited

U.S. PATENT DOCUMENTS

| | | | |
|---|---|---|---|
| 7,596,655 B2* | 9/2009 | Wang et al. | 711/103 |
| 2007/0033332 A1* | 2/2007 | Sinclair et al. | 711/103 |
| 2007/0124531 A1* | 5/2007 | Nishihara | 711/3 |
| 2008/0276036 A1* | 11/2008 | Van Acht et al. | 711/103 |
| 2011/0004720 A1* | 1/2011 | Chiang et al. | 711/103 |
| 2011/0185105 A1* | 7/2011 | Yano et al. | 711/103 |

FOREIGN PATENT DOCUMENTS

| | | |
|---|---|---|
| CN | 1936867 | 3/2007 |
| CN | 101105774 | 1/2008 |
| CN | 101404028 | 4/2009 |

OTHER PUBLICATIONS

English language translation of abstract of CN 1936867 (published Mar. 28, 2007).
English language translation of abstract of CN 101105774 (published Jan. 16, 2008).
English language translation of abstract of CN 101404028 (published Apr. 8, 2009).

* cited by examiner

*Primary Examiner* — Hashem Farrokh
(74) *Attorney, Agent, or Firm* — McClure, Qualey & Rodack, LLP

(57) ABSTRACT

The invention provides a flash storage device. In one embodiment, the flash storage device comprises a flash memory and a controller. The flash memory comprises a plurality of blocks, wherein each of the plurality of blocks comprises a plurality of pages for storing data, and each of the plurality of pages has a physical address. The controller divides a plurality of logical addresses into a plurality of logical address ranges, records a plurality of partial link tables respectively storing a mapping relationship between logical addresses of a corresponding logical address range and corresponding physical addresses, stores the partial link tables in the flash memory, combines the partial link tables to obtain a link table, and converts logical addresses sent by a host to physical addresses according to the link table.

20 Claims, 7 Drawing Sheets

Index table 250

| Logical address range | Physical address of a storage page |
|---|---|
| $L_{A1} \sim L_{AN}$ | $P_A$ |
| $L_{B1} \sim L_{BN}$ | $P_B$ |
| $L_{C1} \sim L_{CN}$ | $P_C$ |
| .... | .... |
| $L_{K1} \sim L_{KN}$ | $P_K$ |

FIG. 2B

Link table 200

| Logical address | Physical address |
|---|---|
| $L_{A1}$ | $P_Q$ |
| ... | ... |
| $L_{AN}$ | $P_M$ |
| $L_{B1}$ | $P_L$ |
| ... | ... |
| $L_{BN}$ | $P_U$ |
| $L_{C1}$ | $P_S$ |
| ... | ... |
| $L_{CN}$ | $P_T$ |
| .... | .... |
| $L_{K1}$ | $P_R$ |
| ... | ... |
| $L_{KN}$ | $P_W$ |

FLASH STORAGE DEVICE AND OPERATION METHOD THEREOF

CROSS REFERENCE TO RELATED APPLICATIONS

This Application claims priority of Taiwan Patent Application No. 98125797, filed on Jul. 31, 2009, the entirety of which is incorporated by reference herein.

BACKGROUND OF THE INVENTION

1. Field of the Invention

The invention relates to flash memories, and more particularly to conversion between logical addresses and physical addresses of flash memories.

2. Description of the Related Art

A flash memory is a non-volatile memory that can be electrically erased and reprogrammed. Flash memories are primarily used in memory cards and USB flash drives for general storage and transfer of data between computers and other digital products. A flash memory costs far less than an EEPROM and therefore has become a dominant memory device applied in electronic products. Examples of devices applying flash memories include Personal Digital Assistants (PDA) and laptop computers, digital audio players, digital cameras and mobile phones.

A host ordinarily uses a flash storage device for data storage. A conventional flash storage device, such as a memory card, comprises a controller and at least one flash memory. When a host wants to store data in a flash storage device, the host sends address and data to be stored in the address to the flash storage device. The address sent by the host for storing data is referred to as a logical address, and addresses used by a flash memory are referred to as physical addresses. Because the logical address has a different format from that of the physical addresses, a controller of the flash storage device must first convert the logical address received from the host to a physical address, so that the flash memory of the flash storage device can store data according to the physical address. When a host wants to read data from the flash storage device, the host sends a logical address where data is to be read to the flash storage device. A controller of the flash storage device then converts the logical address to a physical address, so that the flash memory of the flash storage device can read data from the physical address, and the read-out data can be sent back to the host.

Because a controller of a flash storage device must convert logical addresses to physical addresses, the controller ordinarily has a link table for storing a mapping relationship between logical addresses and physical addresses. The controller can then perform address conversion according to the mapping relationship stored in the link table. The link table must record a mapping relationship for all physical addresses of a flash memory. When data capacity of the flash memory is greater, the data amount of the mapping relationship stored in the link table is also greater. The link table is ordinarily stored in the flash memory. After the flash storage device is enabled, the link table is loaded from the flash memory to a memory of a controller. Whenever the controller writes data to the flash memory, the mapping relationship of the link table stored in the memory of the controller is changed. If the host accesses data stored in the flash storage device at a high frequency, then the workload required by the controller for maintaining the link table increases. Thus, the data access process between the host and the flash storage device may be delayed. Accordingly, a method for improving the efficiency of managing a link table for a controller of a flash storage device is required.

BRIEF SUMMARY OF THE INVENTION

The invention provides a flash storage device. In one embodiment, the flash storage device comprises a flash memory and a controller. The flash memory comprises a plurality of blocks, wherein each of the blocks comprises a plurality of pages for storing data, and each of the pages has a physical address. The controller divides a plurality of logical addresses into a plurality of logical address ranges, records a plurality of partial link tables respectively storing a mapping relationship between logical addresses of a corresponding logical address range and corresponding physical addresses, stores the partial link tables in the flash memory, combines the partial link tables to obtain a link table, and converts logical addresses sent by a host to physical addresses according to the link table.

The invention provides an operation method for a flash storage device. In one embodiment, the flash storage device comprises a flash memory comprising a plurality of blocks, and each of the blocks comprises a plurality of pages for storing data. First, a plurality of logical addresses used by a host is divided into a plurality of logical address ranges. A plurality of partial link tables respectively storing a mapping relationship between logical addresses of a corresponding logical address range and corresponding physical addresses is recorded. The partial link tables are then stored in the flash memory. The partial link tables are then combined to obtain a link table. Finally, logical addresses sent by the host are converted to physical addresses according to the link table.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2A shows an embodiment of a link table according to the invention;

FIG. 2B is a schematic diagram of an index table corresponding to the link table shown in FIG. 2A;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
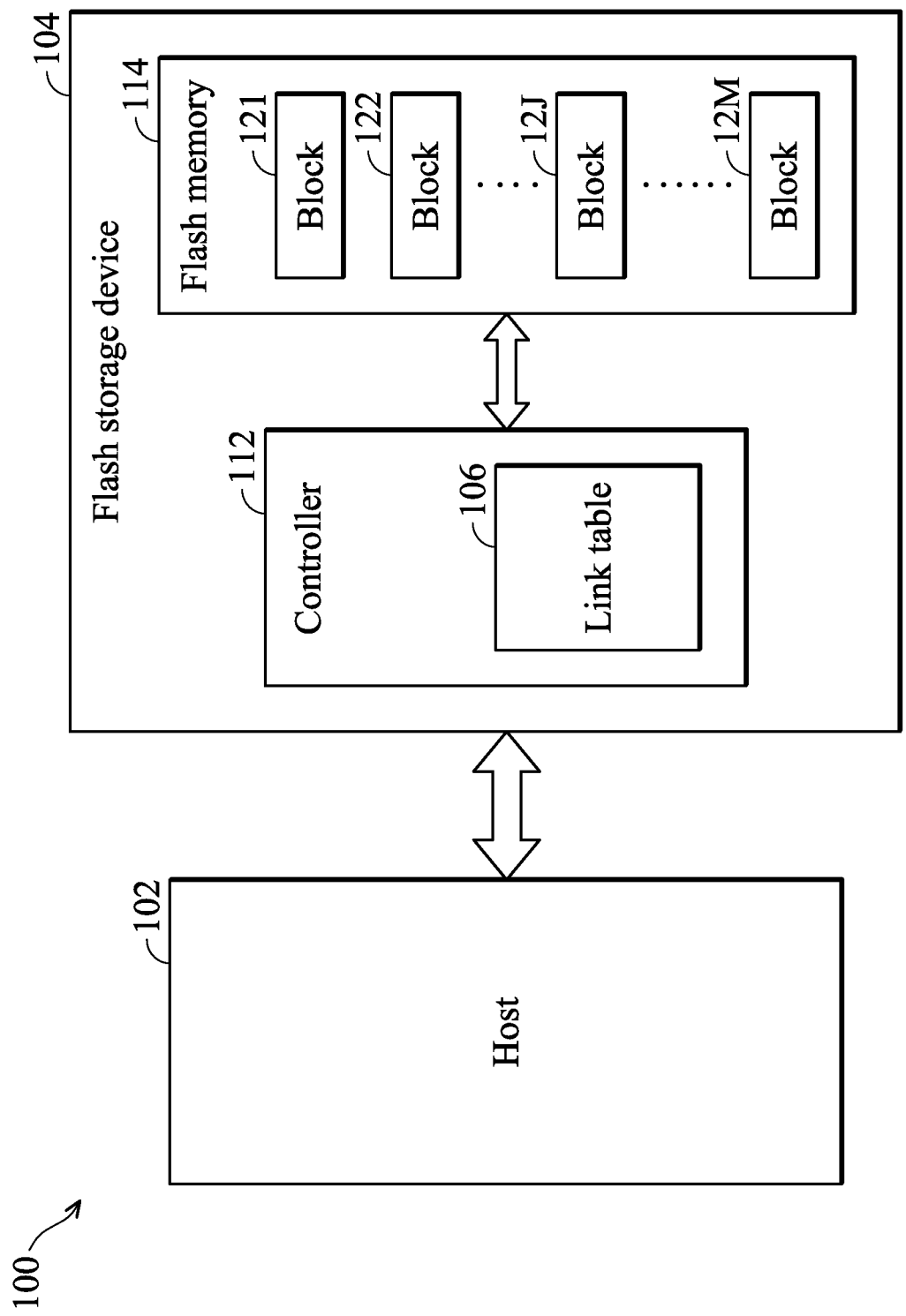
FIG. 1 is a block diagram of a data storage system according to the invention.

Referring to FIG. 1, a block diagram of a data storage system 100 according to the invention is shown. The data storage system 100 comprises a host 102 and a flash storage device 104. The flash storage device 104 stores data for the host 102. In one embodiment, the flash storage device 104 comprises a controller 112 and a flash memory 114. The flash memory 114 comprises a plurality of blocks 121~12M for data storage. Each of the blocks 121~12M comprises a plurality of pages, and each of the pages has a physical address. The controller 112 has a memory storing a link table 106 which records a mapping relationship between logical addresses used by the host 102 and physical addresses used by the flash memory 114. When the host 102 wants to access the flash memory 114, the controller 112 converts a logical address sent by the host 102 to a physical address according to the link table 106, and then accesses data stored in the flash memory 114 according to the physical address.

Referring to FIG. 2A, an embodiment of a link table 200 according to the invention is shown. The link table 200 records a mapping relationship between all logical addresses used by the host 102 and physical addresses. For example, a logical address $L_{A1}$ corresponds to a physical address $P_Q$, a logical address $L_{AN}$ corresponds to a physical address $P_M$, and a logical address $L_{KN}$ corresponds to a physical address $P_W$. The controller 112 divides the logical addresses $L_{A1}$~$L_{KN}$ into a plurality of logical address ranges 201, 202, 203, . . . , 20K, and each of the logical address ranges comprises a plurality of logical addresses. For example, the logical address range 201 comprises logical addresses $L_{A1}$~$L_{AN}$, the logical address range 202 comprises logical addresses $L_{B1}$~$L_{BN}$, and the logical address range 20K comprises logical addresses $L_{K1}$~$L_{KN}$. The link table 200 is then divided into a plurality of partial link tables according to the logical address ranges 201~20K, and each partial link table stores a mapping relationship between logical addresses of one of the logical address ranges 201~20K and physical addresses. The partial link table therefore has less data amount than the link table 200 and only requires a smaller memory space for storage.

The controller 112 stores the partial link tables 201, 202, . . . , 20K in the flash memory 114. In one embodiment, the partial link tables 201, 202, . . . , 20K are respectively stored in one of a plurality of storage pages of the flash memory 114, and the controller 112 stores a mapping relationship between the partial link tables 201, 202, . . . , 20K and the physical addresses of the storage pages in an index table. Referring to FIG. 2B, a schematic diagram of an index table 250 corresponding to the link table 200 shown in FIG. 2A is shown. The storage pages for storing the logical address ranges $L_{A1}$~$L_{AN}$, $L_{B1}$~$L_{BN}$, . . . , $L_{K1}$~$L_{KN}$ respectively have physical addresses $P_A$, $P_B$, . . . , $P_K$. When the host 102 enables the flash storage device 104, the controller 112 can then read the storage pages with the physical addresses $P_A$, $P_B$, . . . , $P_K$ to obtain the partial link tables 201~20K, and then combine the partial link tables 201~20K to obtain a link table 200. The link table 200 can then be stored in a random access memory of the controller 112. The controller 112 can then convert logical addresses sent by the host 102 to physical addresses according to the link table 200.

Figures 3A, 3B:
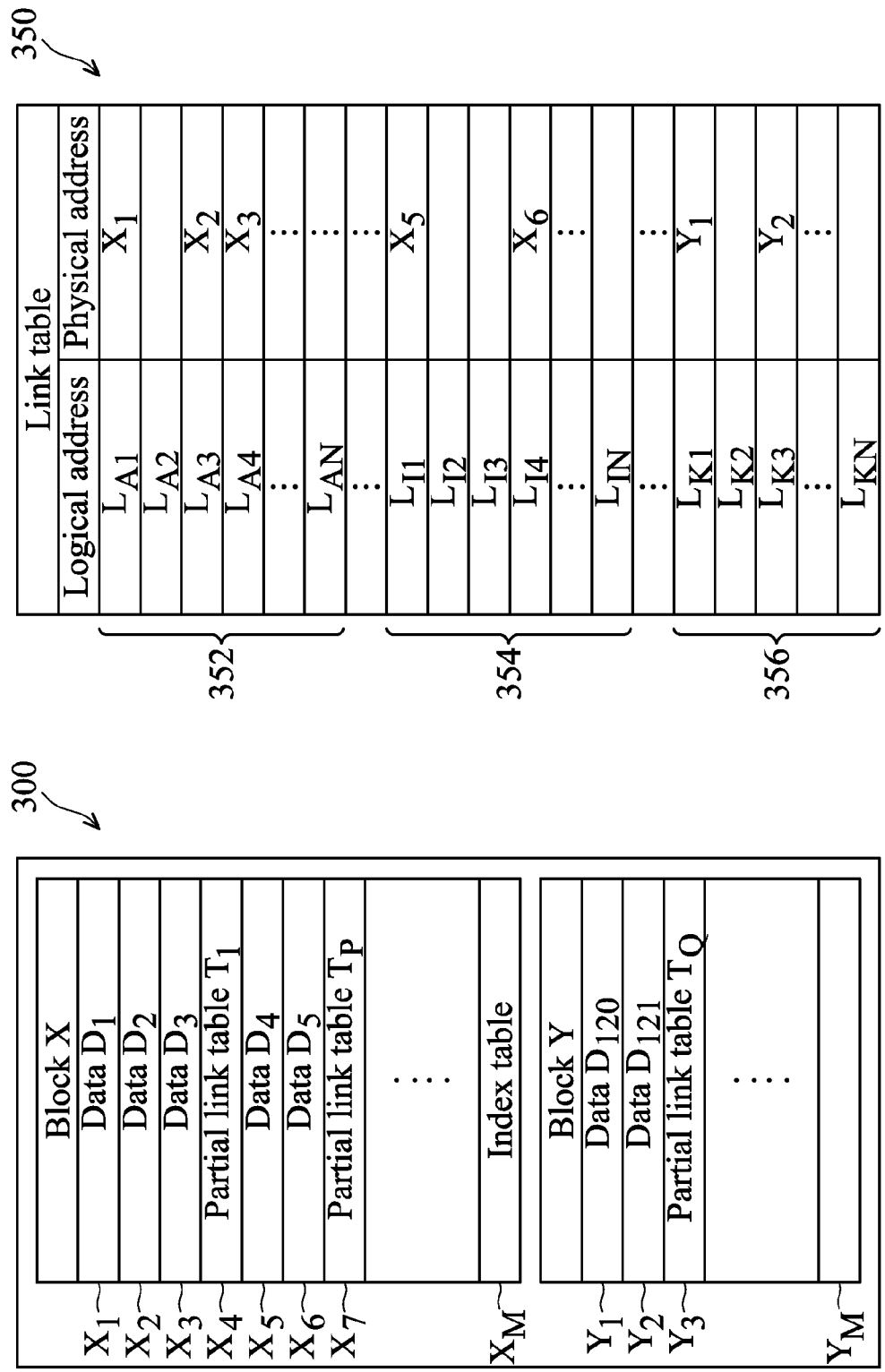
FIG. 3A is a schematic diagram of an embodiment of a flash memory storing partial link tables according to the invention.
FIG. 3B is a schematic diagram of a link table corresponding to the embodiment of FIG. 3A.

Referring to FIG. 3A, a schematic diagram of an embodiment of a flash memory 300 storing partial link tables according to the invention is shown. Assume that the flash memory 300 comprises a block X and a block Y. The block X comprises pages with physical addresses $X_1$~$X_M$. The block Y comprises pages with physical addresses $Y_1$~$Y_M$. Referring to FIG. 3B, a schematic diagram of a link table 350 corresponding to the embodiment of FIG. 3A is shown. The link table 350 is formed by combining a plurality of partial link tables including the partial link table 352 storing the logical addresses $L_{A1}$~$L_{AN}$, the partial link table 354 storing the logical addresses $L_{I1}$~$L_{IN}$, and the partial link table 356 storing the logical addresses $L_{K1}$~$L_{KN}$. Assume that the flash storage device 104 sequentially receives data $D_1$, $D_2$, $D_3$, $D_4$, and $D_5$ respectively with logical addresses $L_{A1}$, $L_{A3}$, $L_{A4}$, $L_{I1}$, and $L_{I4}$. The controller 112 first respectively writes data $D_1$ $D_2$, and $D_3$ into pages $X_1$, $X_2$, and $X_3$ of the block X of the flash memory 300, and records a mapping relationship between the logical addresses $L_{A1}$, $L_{A3}$, and $L_{A4}$ of the data $D_1$, $D_2$, and $D_3$ and the corresponding physical addresses $X_1$, $X_2$, and $X_3$ in the partial link table 352 shown in FIG. 3B.

The controller 112 then writes the data $D_4$ and $D_5$ to the block X of the memory 300. The logical addresses $L_{I1}$ and $L_{I4}$ of the data $D_4$ and $D_5$ are located in a partial link table 354 that is different from that of the previous partial link table 352 corresponding to the previous data $D_1$, $D_2$, and $D_3$. The controller 112 then stores the partial link table 352 corresponding to the previous data $D_1$, $D_2$, and $D_3$ in a page $X_4$ of the block X as a partial link table $T_1$, and stores the physical address $X_4$ of the partial link table $T_1$ in the index table 250. The controller 112 then respectively writes data $D_4$ and $D_5$ into pages $X_5$ and $X_6$ of the block X of the flash memory 300, and records a mapping relationship between the logical addresses $L_{I1}$ and $L_{I4}$ of the data $D_4$ and $D_5$ and the corresponding physical addresses $X_5$ and $X_6$ in the partial link table 354 shown in FIG. 3B. Assume that a logical address of subsequent data falls in a partial link table that is different from that of the previous partial link table 354 corresponding to the previous data $D_4$ and $D_5$, the controller 112 then stores the partial link table 354 corresponding to the previous data $D_4$ and $D_5$ in a page $X_7$ of the block X as a partial link table $T_P$, and stores the physical address $X_7$ of the partial link table $T_P$ in the index table 250. When the controller 112 determines that all pages, except for a last page $X_M$, of the block X has stored data, the controller 112 stores the index table 250 in the last page $X_M$ of the block X. The controller 112 then receives new data from the host 102 and writes the new data into pages $Y_1$~$Y_M$ of the block Y.

Figure 4:
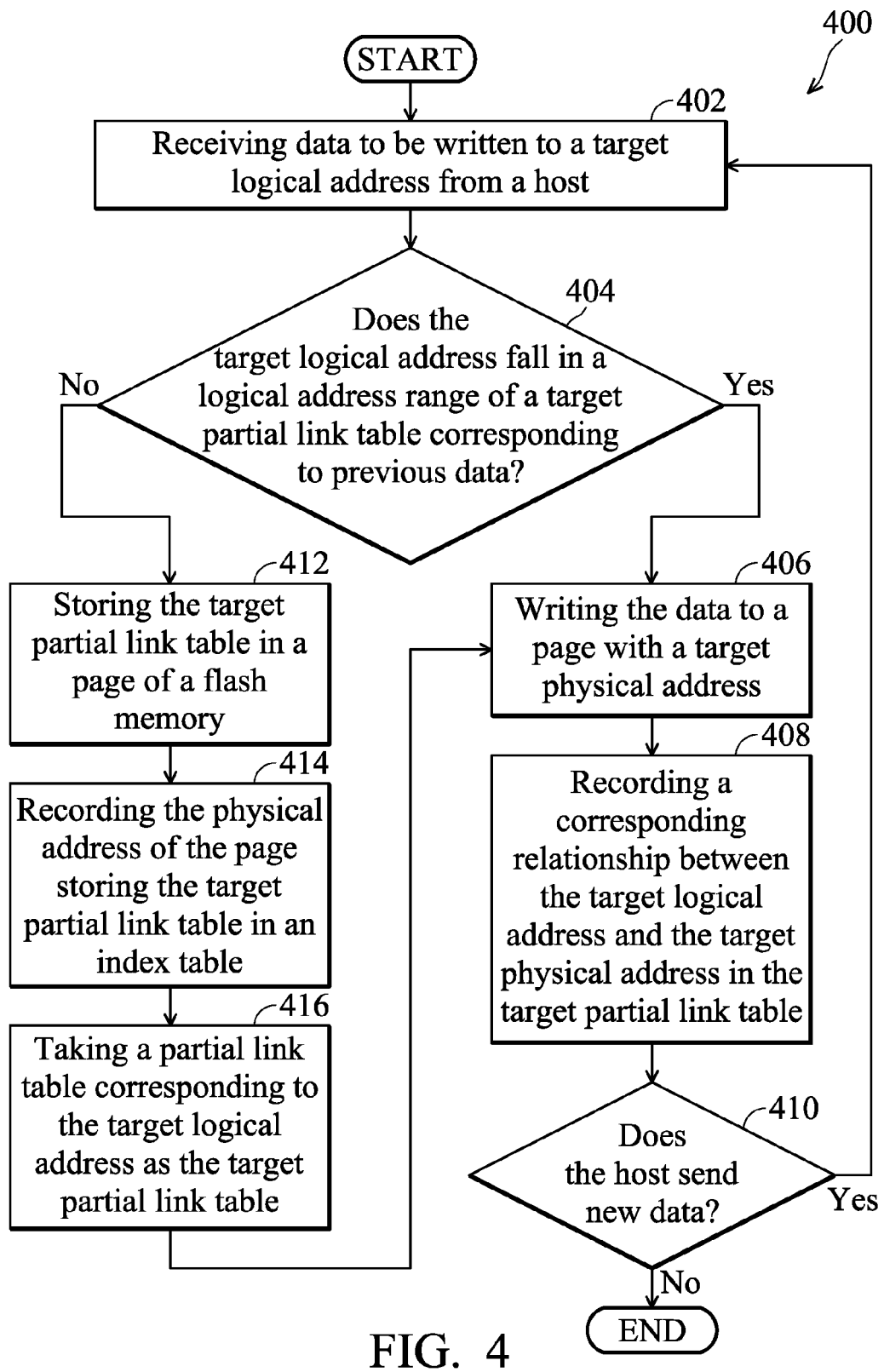
FIG. 4 is a flowchart of a method for writing data to a flash memory according to the invention.

Referring to FIG. 4, a flowchart of a method 400 for writing data to a flash memory 114 according to the invention is shown. First, the controller 112 receives data to be written to a target logical address from the host 102 (step 402). The controller 112 then determines whether the target logical address is located in a logical address range of a target partial link table corresponding to a previous data (step 404). When the target logical address falls in the logical address range of the target partial link table, the controller 112 writes the data to a page with a target physical address (step 406), and records a corresponding relationship between the target logical address and the target physical address in the target partial link table (step 408). When the target logical address falls in the logical address range of the target partial link table (step 404), the controller 112 stores the target partial link table in a page of the flash memory 114 (step 412), records the physical address of the page storing the target partial link table in an index table (step 414), and retrieves a partial link table corresponding to the target logical address from the flash memory 114 as the target partial link table (step 416). The controller 112 then writes the data to a page with a target physical address (step 406), and records a corresponding relationship between the target logical address and the target physical address in the target partial link table (step 408). The controller 112 continues to perform the method 400 for writing data to the flash memory 114 until the host does not send new data (step 410).

Figure 5:
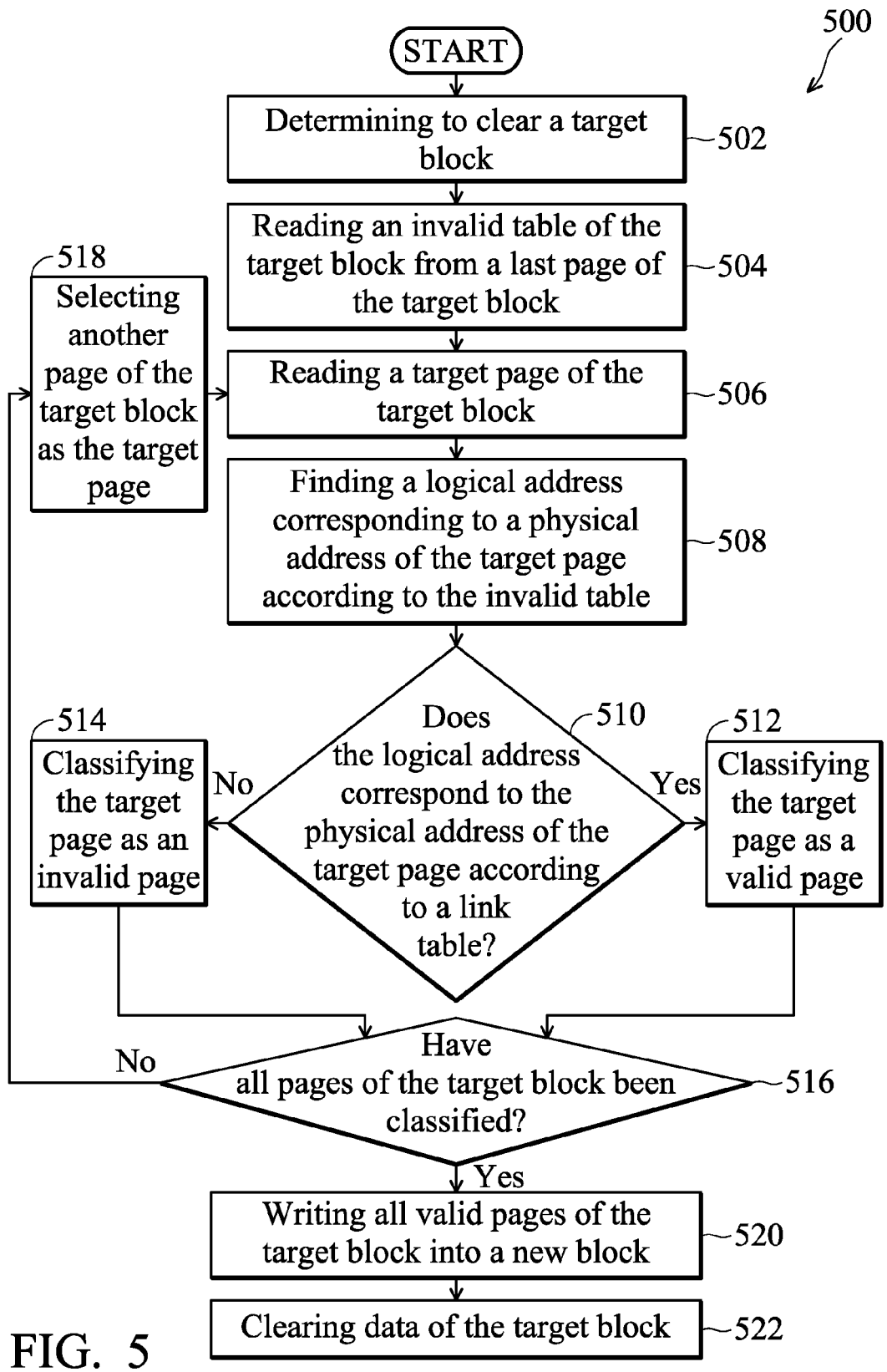
FIG. 5 is a flowchart of a method for clearing data stored in a block of a flash memory according to the invention.
Figures 6, 7:
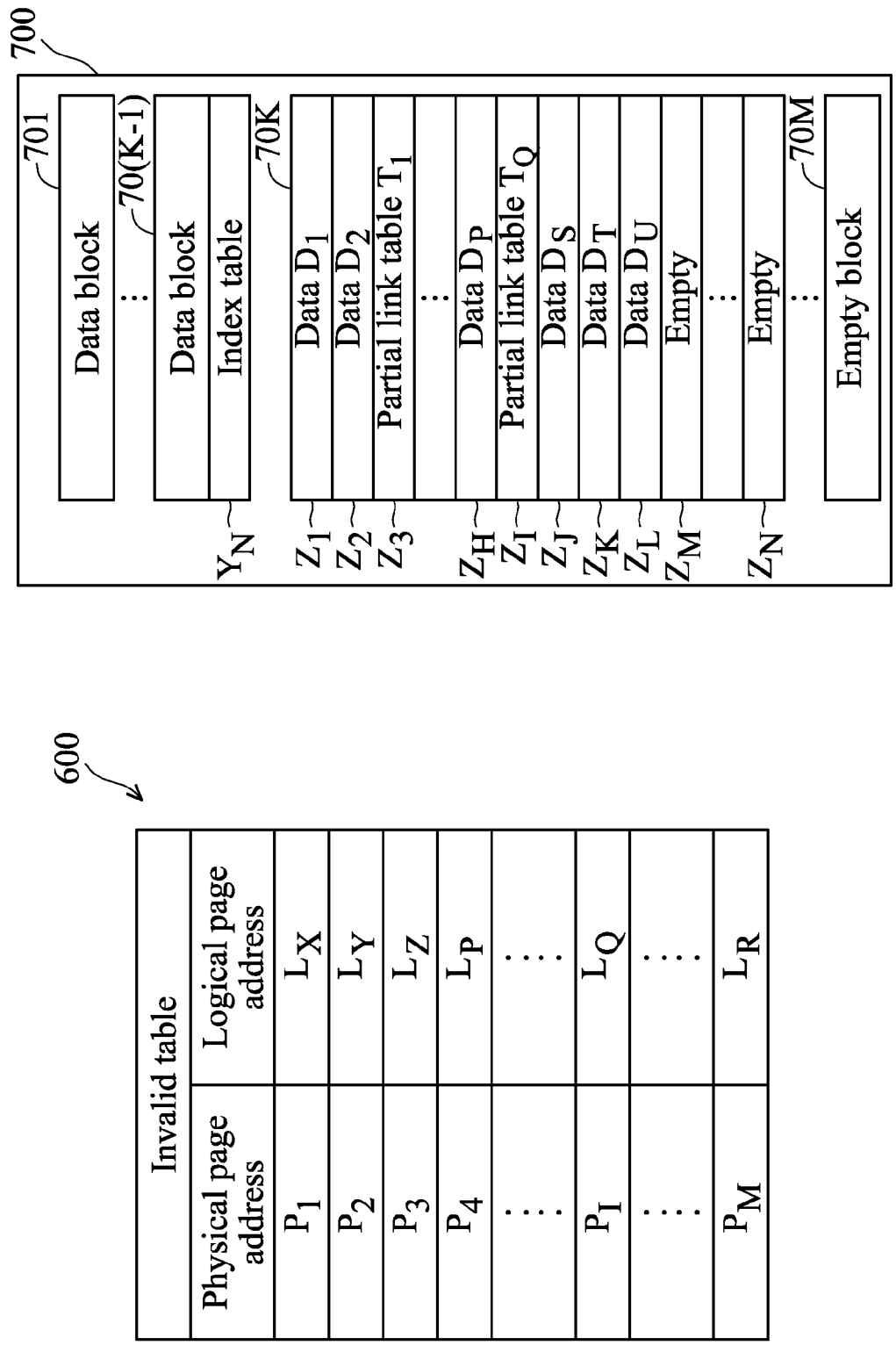
FIG. 6 is a schematic diagram of an embodiment of an invalid table according to the invention.
FIG. 7 is a schematic diagram of an embodiment of blocks of a flash memory according to the invention.

Referring to FIG. 5, a flowchart of a method 500 for clearing data stored in a block of a flash memory 114 according to the invention is shown. Each block of the flash memory 114 has an invalid table stored therein for recording a mapping relationship between physical addresses of all pages of the block and corresponding logical addresses. Referring to FIG. 6, a schematic diagram of an embodiment of an invalid table 600 according to the invention is shown. The invalid table 600 stores physical addresses of all physical addresses $P_1 \sim P_M$ of a block and its corresponding logical addresses $L_X \sim L_R$. In one embodiment, the controller 112 maintains invalid tables of blocks and respectively stores the invalid tables in last pages of the corresponding blocks.

First, the controller 112 determines to clear a target block (step 502). The controller 112 then reads an invalid table of the target block from a last page of the target block (step 504). The controller 112 then reads a target page of the target block (step 506), and determines whether the target page is a valid page or an invalid page. When a logical address of data stored in the target page has been changed to be mapped to a physical address of another storage page of the flash memory 114, the data stored in eth target page is useless, and the target page is determined to be an invalid page. Otherwise, the target page is determined to be a valid page. The controller 112 first finds a logical address corresponding to a physical address of the target page according to the invalid table (step 508). The controller 112 then determines whether the logical address corresponds to the physical address of the target page according to a link table (step 510). If the logical address is mapped to the physical address of the target page according to the link table, the data stored in the target page is currently used by the host 102, and the controller 112 classifies the target page as a valid page (step 512). If the logical address is not mapped to the physical address of the target page according to the link table (step 510), the data stored in the target page has been abandoned by the host 102, and the controller 112 classifies the target page as an invalid page (step 514).

The controller 112 then checks whether all pages of the target block have been classified (step 516). If the target block still comprises pages which have not been classified, the controller 112 selects another page of the target block as the target page (step 518), and then performs step 506~510 to classify the new target page. The steps 506~510 is then repeatedly performed until all pages of the target block have been classified (step 516). Finally, the controller 112 writes all valid pages of the target block into a new block (step 520). After all valid pages of the target block have been written into the new block, the target block stores all data except for the abandoned data, and the controller 112 erases the data from the target block to clear the target block (step 522).

Referring to FIG. 7, a schematic diagram of an embodiment of blocks of a flash memory 700 according to the invention is shown. The flash memory 700 comprises a plurality of blocks 701~70(K-1) and 70K~70M. All pages of the blocks 701~70(K-1) have been written with data. Only some pages $Z_1 \sim Z_L$ of the block 70K have been written with data, and pages $Z_M \sim Z_N$ of the block 70K are empty pages which have not been written with data. The blocks 70(K+1) (not shown in FIG. 7)~70M are empty blocks. Because the blocks 701~70(K-1) have been written with data, the last pages of the blocks 701~70(K-1) store index tables, and the last page of the block 70(K-1) stores the most updated data version of the index tables.

Figure 8:
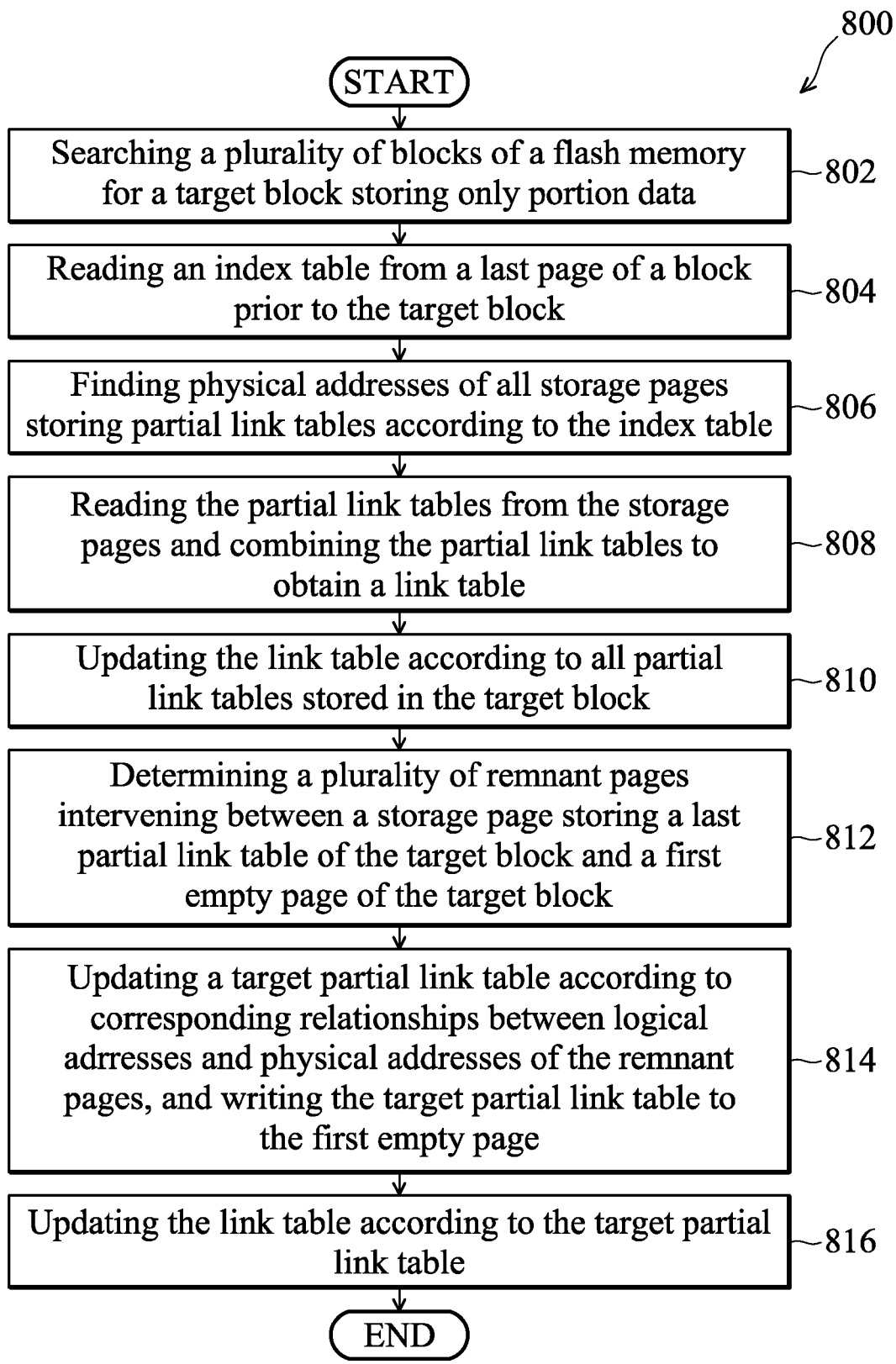
FIG. 8 is a flowchart of a method for rebuilding a link table according to the invention.

Assume that after the controller 112 writes data $D_U$ to a storage page $Z_L$ of the block 70K, a power supply of the flash memory 700 is shut off. After the flash memory device 104 is enabled again, the controller 112 must rebuild a link table 106 for conversion between logical addresses and physical addresses according to data stored in the flash memory 700. Referring to FIG. 8, a flowchart of a method 800 for rebuilding a link table according to the invention is shown. First, the controller 112 searches a plurality of blocks 701-70M of the flash memory 700 for a target block which stores data and has empty space (step 802). As shown in FIG. 7, the block 70K is determined to be the target block. The controller 112 then reads an index table from a last page $Y_N$ of the block 70(K-1) prior to the target block 70K (step 804). The controller 112 then finds physical addresses of all storage pages storing partial link tables according to the index table (step 806). The controller 112 then reads the partial link tables from the storage pages and combines the partial link tables to obtain a link table 106 (step 808).

The storage pages recorded in the index table stored in the last page $Y_N$ of the block 70(K-1) does not store all of the partial link tables of the most updated data versions. For example, the partial link tables $T_1 \sim T_Q$ stored in the block 70K are not recorded in the index table stored in the last page $Y_N$ of the block 70(K-1). The controller 112 therefore updates the link table 106 stored in a memory of the controller 112 according to all partial link tables $T_1 \sim T_Q$ stored in the target block 70K (step 810). Logical-to-physical mapping relationships of the last pages $Z_J \sim Z_L$, however, are not recorded in the link table 106 of the controller 112. The controller 112 then determines a plurality of remnant pages $Z_J \sim Z_L$ intervening between a storage page $Z_I$ storing a last partial link table $T_Q$ of the target block 70K and a first empty page $Z_M$ of the target block 70K (step 812). The controller 112 then updates a target partial link table according to corresponding relationships between logical addresses and physical addresses of the remnant pages $Z_J \sim Z_L$, and writes the target partial link table to the first empty page $Z_M$ (step 814). Finally, the controller 112 updates the link table 106 of the controller 112 according to the target partial link table (step 816). Because the controller 112 has rebuilt a link table 106 with the most updated data version, the controller 112 can then convert logical addresses received from the host 102 to physical addresses according to the rebuilt link table 106.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flash storage device, comprising:
  a flash memory, comprising a plurality of blocks, wherein each of the blocks comprises a plurality of pages for storing data, and each of the pages has a physical address;
  a controller, dividing a plurality of logical addresses into a plurality of logical address ranges, recording a plurality of partial link tables respectively storing a mapping relationship between logical addresses of a corresponding logical address range and corresponding physical addresses, storing each of the partial link tables in a page of the flash memory, combining the partial link tables to obtain a link table, converting logical addresses sent by a host to physical addresses according to the link table, and maintaining an index table for recording a mapping relationship between the partial link tables and physical addresses of pages storing the partial link tables, wherein when the controller receives write data to be written to a target logical address from the host, the controller determines whether the target logical address falls in a logical address range of a target partial link table corresponding to a previous write data.

2. The flash storage device as claimed in claim 1, wherein when all pages except for a last page, of a used block of the flash memory have stored data, the controller stores the index table in the last page of the used block.

3. The flash storage device as claimed in claim 1, wherein when the target logical address falls in the logical address range of the target partial link table, the controller writes the write data to a page of the flash memory, and records a mapping relationship between the target logical address and the physical address of the page storing the write data in the target partial link table.

4. The flash storage device as claimed in claim 1, wherein when the target logical address is not located in the logical address range of the target partial link table, the controller stores the target partial link table in a page of the flash memory, and stores a mapping relationship between the target partial link table and the physical address of the page storing the target partial link table in an index table.

5. The flash storage device as claimed in claim 4, wherein after the controller stores the mapping relationship in the index table, the controller writes the write data to a page of the flash memory, loads a partial link table corresponding to the target logical address as the target partial link table, and records a mapping relationship between the target logical address and the physical address of the page storing the write data in the target partial link table.

6. The flash storage device as claimed in claim 1, wherein the controller maintains a plurality of invalid tables respectively storing a mapping relationship between physical addresses of one of the blocks of the flash memory and corresponding physical addresses, and the invalid tables are stored in the corresponding blocks.

7. The flash storage device as claimed in claim 6, wherein the controller finds a plurality of first logical addresses corresponding to a plurality of first physical addresses of a plurality of pages of the target block according to the index table, determines whether the first logical addresses correspond to the first physical addresses according to the link table, and classifies the pages into invalid pages when the first logical addresses do not correspond to the first physical addresses according to the link table.

8. The flash storage device as claimed in claim 1, wherein when the controller determines to clear a target block of the flash memory, the controller classifies pages of the target block into a valid page or an invalid page, writes data of all valid pages of the target block into a new block, and then clears data stored in the target block.

9. The flash storage device as claimed in claim 1, wherein when the controller wants to rebuild the link table, the controller searches the blocks of the flash memory for a target block which stores data and has empty space, reads the index table from a last page of a previous block prior to the target block, finds physical addresses of storage pages storing the partial link tables according to the index table, and reads the partial link tables from the storage pages to combine the partial link table to obtain the link table.

10. The flash storage device as claimed in claim 9, wherein when the controller wants to rebuild the link table, the controller further records physical addresses of the storage pages of the target block for storing the partial link tables in the index table, updates the link table according to the partial link tables stored in the target block, determines a plurality of data pages intervening between a last partial link table of the target block and an empty page in the target block, and records a mapping relationship between logical addresses and physical addresses of the data pages in the link table.

11. An operation method for a flash storage device, wherein the flash storage device comprises a flash memory comprising a plurality of blocks, wherein each of the blocks comprises a plurality of pages for storing data, comprising:
dividing a plurality of logical addresses used by a host into a plurality of logical address ranges;
recording a plurality of partial link tables respectively storing a mapping relationship between logical addresses of a corresponding logical address range and corresponding physical addresses;
storing each of the partial link tables in a page of the flash memory;
combining the partial link tables to obtain a link table;
converting logical addresses sent by the host to physical addresses according to the link table; and
maintaining an index table for recording a mapping relationship between the partial link tables and physical addresses of pages storing the partial link tables, wherein when the flash storage device receives write data to be written to a target logical address from the host, determining whether the target logical address falls in a logical address range of a target partial link table corresponding to a previous write data.

12. The operation method as claimed in claim 11, wherein the method further comprises:
when all pages except for a last page of a used block of the flash memory have stored data, storing the index table in the last page of the used block.

13. The operation method as claimed in claim 11, wherein when the target logical address falls in the logical address range of the target partial link table, the method further comprises:
writing the write data to a page of the flash memory; and
recording a mapping relationship between the target logical address and the physical address of the page storing the write data in the target partial link table.

14. The operation method as claimed in claim 11, wherein when the target logical address is not located in the logical address range of the target partial link table, the method further comprises:
storing the target partial link table in a page of the flash memory; and
recording a mapping relationship between the target partial link table and the physical address of the page storing the target partial link table in an index table.

15. The operation method as claimed in claim 14, wherein the method further comprises:
after the mapping relationship is stored in the index table, writing the write data to a page of the flash memory;
loading a partial link table corresponding to the target logical address as the target partial link table; and
recording a mapping relationship between the target logical address and the physical address of the page storing the write data in the target partial link table.

16. The operation method as claimed in claim 11, wherein the method further comprises:
maintaining a plurality of invalid tables respectively storing a mapping relationship between physical addresses of one of the blocks of the flash memory and corresponding physical addresses; and
storing the invalid tables in the corresponding blocks.

17. The operation method as claimed in claim 11, wherein when the flash storage device determines to clear a target block of the flash memory, the method further comprises:
- classifying pages of the target block into a valid page or an invalid page;
- writing data of all valid pages of the target block into a new block; and
- clearing data stored in the target block.

18. The operation method as claimed in claim 17, wherein classification of the pages of the target block into a valid page or an invalid page comprises:
- finding a plurality of first logical addresses corresponding to a plurality of first physical addresses of a plurality of pages of the target block according to the index table;
- determining whether the first logical addresses correspond to the first physical addresses according to the link table; and
- classifying the pages into invalid pages when the first logical addresses do not correspond to the first physical addresses according to the link table.

19. The operation method as claimed in claim 11, wherein when the flash storage device wants to rebuild the link table, the method further comprises:
- searching the blocks of the flash memory for a target block which stores data and has empty space;
- reading the index table from a last page of a previous block prior to the target block;
- finding physical addresses of storage pages storing the partial link tables according to the index table; and
- reading the partial link tables from the storage pages to combine the partial link table to obtain the link table.

20. The operation method as claimed in claim 19, wherein when the flash storage device wants to rebuild the link table, the method further comprises:
- recording physical addresses of the storage pages of the target block for storing the partial link tables in the index table;
- updating the link table according to the partial link tables stored in the target block;
- determining a plurality of data pages intervening between a last partial link table of the target block and an empty page in the target block; and
- recording a mapping relationship between logical addresses and physical addresses of the data pages in the link table.

* * * * *